(12) United States Patent  
Kim et al.

(10) Patent No.: US 8,897,946 B2  
(45) Date of Patent: Nov. 25, 2014

(54) CONTROL METHOD OF HYBRID VEHICLE

(71) Applicants: Hyundai Motor Company, Seoul (KR); Kia Motors Corporation, Seoul (KR)

(72) Inventors: Sang Joon Kim, Seoul (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/275,283

(22) Filed: May 12, 2014

(65) Prior Publication Data

US 2014/0244088 A1 Aug. 28, 2014

Related U.S. Application Data

(63) Continuation-in-part of application No. 13/534,777, filed on Jun. 27, 2012, now abandoned.

(30) Foreign Application Priority Data

Dec. 14, 2011 (KR) .................. 10-2011-0134871

(51) Int. Cl.
| | |
|---|---|
| *B60W 20/00* | (2006.01) |
| *B60K 6/365* | (2007.10) |
| *B60K 6/387* | (2007.10) |
| *B60K 6/445* | (2007.10) |
| *B60W 10/08* | (2006.01) |
| *B60W 30/188* | (2012.01) |
| *F16H 3/72* | (2006.01) |
| *B60L 15/20* | (2006.01) |
| *B60K 6/38* | (2007.10) |
| *F16H 37/10* | (2006.01) |

(52) U.S. Cl.
CPC ............ *B60W 20/10* (2013.01); *B60K 6/365* (2013.01); *B60K 6/387* (2013.01); *B60K 6/445* (2013.01); *B60W 10/08* (2013.01); *B60W 20/00* (2013.01); *B60W 30/188* (2013.01); *F16H 3/728* (2013.01); *Y10S 903/902* (2013.01); *B60L 15/2045* (2013.01); *B60K 2006/381* (2013.01); *B60W 2710/0644* (2013.01); *B60W 2710/083* (2013.01); *B60W 2710/105* (2013.01); *F16H 2037/101* (2013.01); *F16H 2200/2007* (2013.01); *F16H 2200/2041* (2013.01)

USPC ................... 701/22; 180/65.265; 903/902

(58) Field of Classification Search
USPC ............... 701/22, 51, 54, 64, 66, 67, 95, 57; 180/65.1, 65.21, 65.235, 65.26, 65.28, 180/65.285, 65.7; 477/7, 8, 13, 14, 15, 16, 477/17, 35, 39
See application file for complete search history.

(56) References Cited

U.S. PATENT DOCUMENTS

| | | | |
|---|---|---|---|
| 6,275,762 B1 * | 8/2001 | Salg ............................... 701/69 |
| 6,793,600 B2 | 9/2004 | Hiraiwa | |

(Continued)

FOREIGN PATENT DOCUMENTS

JP   2006046445 A   2/2006

*Primary Examiner* — Mary Cheung  
*Assistant Examiner* — Rodney Butler  
(74) *Attorney, Agent, or Firm* — Edwards Wildman Palmer LLP; Peter F. Corless (57) ABSTRACT

A control method of a hybrid vehicle that includes engages a second clutch and in response outputs a torque through an output shaft that is connected to the second carrier via torque supplied from an engine and a first and second motor-generators. Accordingly, the speed of the engine is controlled via the first motor-generator, and a torque of an output shaft is control via the second motor-generator. Accordingly, the second motor-generator is used to control an operating point of the engine so that a base motor torque is effectively set.

4 Claims, 7 Drawing Sheets

(56) References Cited

U.S. PATENT DOCUMENTS

| | | | |
|---|---|---|---|
| 8,251,165 B2* | 8/2012 | Katsuta et al. | 180/65.265 |
| 2008/0236912 A1* | 10/2008 | Ueoka et al. | 180/65.2 |
| 2008/0243322 A1 | 10/2008 | Nobumoto et al. | |
| 2010/0125021 A1 | 5/2010 | Matsubara et al. | |
| 2010/0147610 A1* | 6/2010 | Katsuta et al. | 180/65.265 |
| 2011/0202222 A1* | 8/2011 | Yamamoto | 701/22 |
| 2012/0059560 A1* | 3/2012 | Balton et al. | 701/54 |
| 2012/0271494 A1 | 10/2012 | Kim et al. | |

* cited by examiner

$$(I_{ENG} + I_{C1} + I_{R2})\dot{\omega}_{ENG} = \tau_{ENG} + \frac{1+R_1+R_2}{R_1}T_{MG1} - R_2 T_{MG2} \longrightarrow \text{Formula (1)}$$

$$\omega_{MG1} = \frac{1+R_1+R_2}{R_1}\omega_{ENG} - \frac{1+R_2}{R_1}\omega_{out} \longrightarrow \text{Formula (2)}$$

$$\tau_{out} = (1+R_2)T_{MG2} - \frac{1+R_2}{R_1}T_{MG1} \longrightarrow \text{Formula (3)}$$

$$\tau_{MG1}^{SpdControl} = \tau_{MG1}^{F/F} + \tau_{MG1}^{F/B}$$ → Formula (4)

$$\tau_{MG1}^{F/F} = K_{F/F\_ENG}^{EVT2}\left(\frac{R_1}{1+R_1+R_2}\right)\tau_{ENG} + K_{F/F\_MG2}^{EVT2}\left(-\frac{R_1 R_2}{1+R_1+R_2}\right)\tau_{MG2}$$ → Formula (5)

$$\tau_{MG1}^{F/B} = f_{PI}^{EVT2}(\omega_{MG1}^{Target} - \omega_{MG1})$$ → Formula (6)

$$\omega_{MG1}^{Target} = \frac{1+R_1+R_2}{R_1}\omega_{ENG}^{Target} - \frac{1+R_2}{R_1}\omega_{out}$$ → Formula (7)

MG2

$$\tau_{MG2}^{Base} = \frac{1}{1+R_2}\tau_{out}^{Demand} + \frac{1}{R_1}\tau_{MG1}$$ → Formula (8)

CONTROL METHOD OF HYBRID VEHICLE

CROSS-REFERENCE TO RELATED APPLICATION

This application is a Continuation in Part of U.S. patent application Ser. No. 13/534,777, filed Jun. 27, 2012, which claims priority to and the benefit of Korean Patent Application No. 10-2011-0134871 filed in the Korean Intellectual Property Office on Dec. 14, 2011, the entire contents of which are incorporated herein by reference.

BACKGROUND OF THE INVENTION (a) Field of the Invention

The present invention relates to a control method for a hybrid vehicle that enables a continuous shift of a transmission by using an engine, a first motor-generator, and a second motor-generator.

(b) Description of the Related Art

Generally, an automatic transmission utilizes hydraulic pressure to shift gears in multiple steps to output the appropriate amount of torque from a rotation torque of an engine/motor based on various driving conditions. Some hybrid vehicles utilize two motor/generators (MG) and one engine that are connected through a planetary gear. In particular, the motor/generator is control in order to achieve a continuously variable shifting.

The engine, the first and second motor/generators, and two planetary gear sets are used to continuously vary the output speed of a transmission according to various driving conditions. Here, the speeds of each the first and second motor/generators are controlled.

The first motor/generator is speed-controlled according to the driving conditions of the engine and the second motor/generator is torque-controlled together with the engine to control the entire torque output. Meanwhile, while the first motor-generator is being used to control a driving point control of the engine, in a flexible hybrid system (FHS4) there is still no method for effectively setting a base motor torque.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a control method for a hybrid vehicle having advantages of effectively setting a base motor torque when a first motor-generator in a flexible hybrid system (FHS4) is used to control an operating point of an engine.

In an exemplary embodiment of the present invention, a control method of a hybrid vehicle includes i.) a first planetary gear set having a first sun gear, a first planetary gear, a first ring gear, and a first carrier, ii.) a second planetary gear set having a second sun gear, a second planetary gear, a second ring gear, and a second carrier, iii.) an engine of which an output shaft thereof is connected to the first carrier, iv.) a first motor-generator that is configured to rotate the first ring gear, v.) a second motor-generator that is connected to the second sun gear to rotate the second sun gear and the first sun gear, vi.) a first brake configured to brake the first ring gear, vii.) a second brake configured to brake the second ring gear, viii.) a first clutch that selectively connects the first ring gear with the first carrier, and ix.) a second clutch that selectively connects the first carrier with the second ring gear.

In particular, in the exemplary embodiment of the present invention, the second clutch is engaged and torque is output through an output shaft, outputting torque through an output shaft that is connected to the second carrier via torque supplied from engine and the first and second motor-generators. Then the speed of the engine is controlled via the first motor-generator, and the torque of the output shaft is controlled via the second motor-generator.

The rotation speed of the first motor-generator is controlled such that the engine reaches a predetermined target speed.

The target speed of the engine may be calculated by Formula 2 below.

$$\omega_{MG1} = \frac{1+R_1+R_2}{R_1}\omega_{ENG} - \frac{1+R_2}{R_1}\omega_{out} \qquad \text{Formula 2}$$

A torque of the output shaft may be calculated by Formula 3 below.

$$\tau_{out} = (1+R_2)T_{MG2} - \frac{1+R_2}{R_1}T_{MG1} \qquad \text{formula 3}$$

A target torque for a speed control of the first motor-generator may be calculated by Formulas 4, 5, and 6 below.

$$\tau_{MG1}^{SpdControl} = \tau_{MG1}^{F/F} + \tau_{MG1}^{F/B} \qquad \text{Formula 4}$$

$$\tau_{MG1}^{F/F} = K_{F/F,ENG}^{EVT2}\left(-\frac{R_1}{1+R_1+R_2}\right)\tau_{ENG} + K_{F/F,MG2}^{EVT2}\left(-\frac{R_1R_2}{1+R_1+R_2}\right)\tau_{MG2} \qquad \text{Formula 5}$$

$$\tau_{MG1}^{F/B} = f_{PI}^{EVT2}\left(\omega_{MG1}^{Target} - \omega_{MG1}\right) \qquad \text{Formula 6}$$

A target torque for a torque control of the second motor-generator may be calculated by a below formula 8.

$$\tau_{MG2}^{Base} = \frac{1}{1+R_2}\tau_{out}^{Demand} + \frac{1}{R_1}\tau_{MG1} \qquad \text{Formula 8}$$

As described above, in a control method for a hybrid vehicle according to the present invention, the second motor-generator is used to control an operating point of the engine such that a base motor torque is effectively set.

DESCRIPTION OF SYMBOLS

E: engine
MG1: first motor-generator
MG2: second motor-generator
PG1: first planetary gear set
R1: first ring gear,
S1: first sun gear
P1: first planetary gear
C1: first carrier
PG2: second planetary gear set
R2: second ring gear,
S2: second sun gear
P2: second planetary gear
C2: second carrier
BK1: first brake
BK2: second brake
CL1: first clutch
CL2: second clutch
OS1: first output shaft
OS2: second output shaft
CU: Control Unit

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, control logic executed by a control unit of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN). The processes executed below may be executed using a plurality of units or a single unit. Thus, the illustrative embodiment is not intended to be limited as such.

Figure 1:
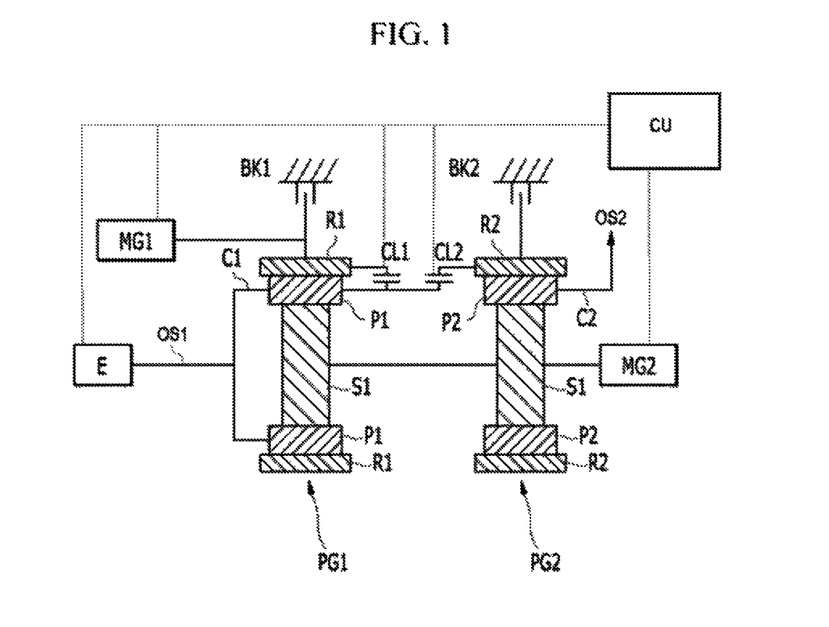
FIG. 1 is a schematic diagram of a hybrid vehicle gear shifting system according to an exemplary embodiment of the present invention.

FIG. 1 is a schematic diagram of a hybrid vehicle gear shifting system according to an exemplary embodiment of the present invention. As shown in FIG. 1, a hybrid vehicle includes an engine 100, a first planetary gear set PG1, a second planetary gear set PG2, a first motor-generator MG1, a first brake BK1, a first clutch CL1, a second clutch CL2, a second brake BK2, and a second motor-generator MG2.

The first planetary gear set PG1 includes a first sun gear S1, a first planetary gear P1, a first ring gear R1, and a first carrier C1, and an output shaft of the engine 100 is configured to rotate the first sun gear S1. The output shaft of the first motor-generator MG1 is configured to rotate the first ring gear R1, and the first brake BK1 selectively brakes the output shaft of the first motor-generator MG1 and the rotation of the first ring gear R1.

The first clutch CL1 selectively connects the first ring gear R1 with the first carrier C1, and the second clutch CL2 selectively connects the first carrier C1 with the second ring gear R2. The second brake BK2 is configured to brake the second ring gear R2, and the second carrier C2 is connected to the output shaft. The first sun gear S1 is directly connected to the second sun gear S2, and the second motor-generator MG2 is configured to rotate the second sun gear S2.

In a complex divergence condition of the exemplary embodiment of the present invention, the second clutch CL2 is operated such that the first carrier C1 is directly connected to the second carrier C2, and the engine 100, the first motor-generator MG1, and the second motor-generator MG2 are operated so that a torque is outputted through the second carrier C2.

Figure 2:
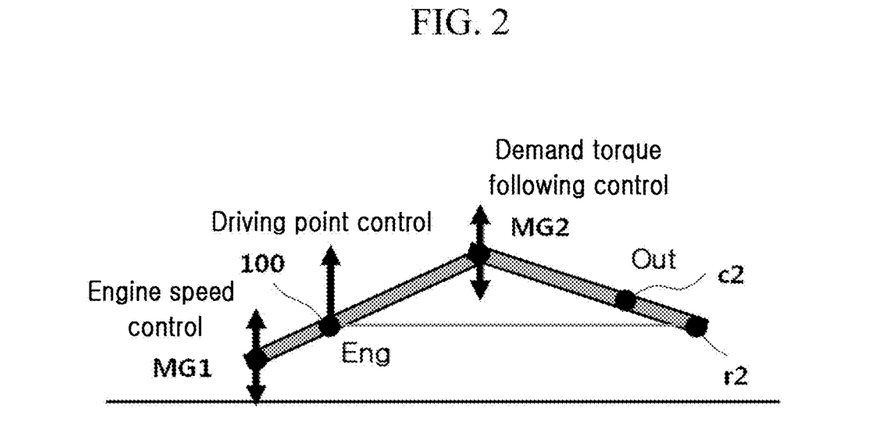
FIG. 2 is a graph showing a hybrid gear shifting system as a lever type according to an exemplary embodiment of the present invention.

FIG. 2 is a lever graph showing a hybrid gear shifting system according to an exemplary embodiment of the present invention. Referring to FIG. 2, the first clutch CL1 is operated so that rotation speed of the second ring gear R2 is equal to that of the engine 100, and the driving point control (e.g., speed control) of the engine 100 is performed by the first motor-generator MG1, while the second motor-generator MG2 is controlled by a requested output torque.

Figure 3:
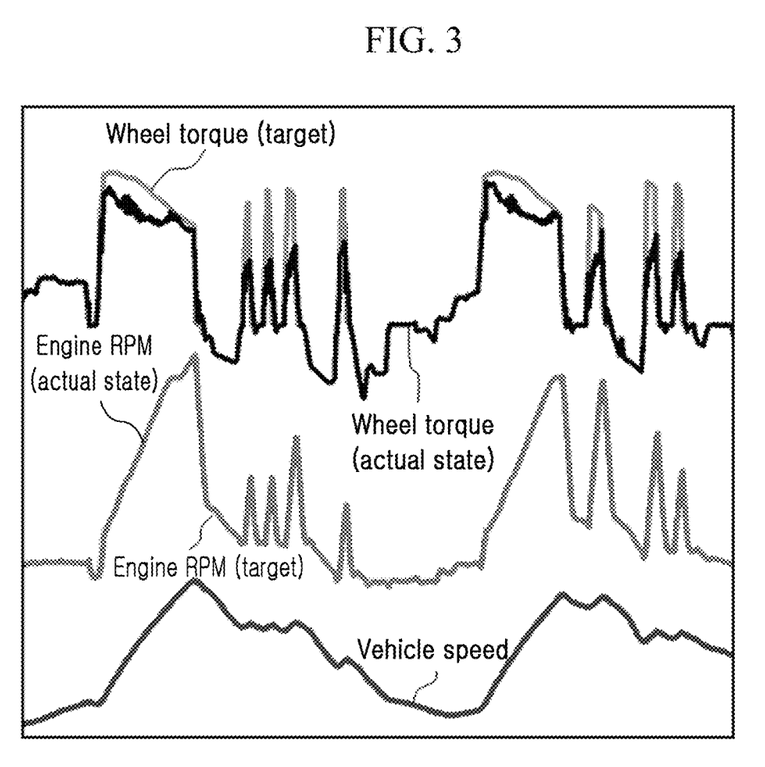
FIG. 3 is a graph showing a vehicle speed, an engine rotation speed, and a wheel torque according to an exemplary embodiment of the present invention.

FIG. 3 is a graph showing a vehicle speed, an engine rotation speed, and a wheel torque according to an exemplary embodiment of the present invention. The horizontal axis denotes time and the vertical axis denotes torque or speed. A vehicle speed, an engine rotation speed (target, present) and a wheel torque (target, present) are shown as well. The wheel torque is proportional to the torque of the output shaft.

Figure 4:
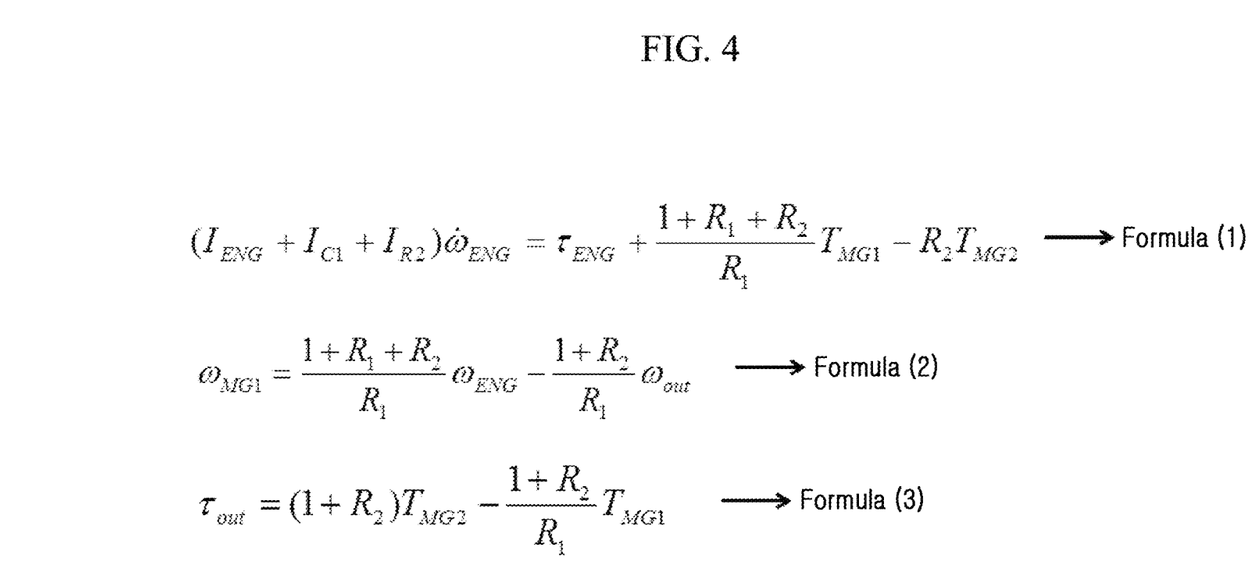
FIG. 4 shows formulas for controlling a hybrid vehicle gear shifting system according to an exemplary embodiment of the present invention.

FIG. 4 shows formulas for controlling a hybrid vehicle gear shifting system according to an exemplary embodiment of the present invention. The speed of the engine 100 is calculated, by e.g. a control unit installed in the vehicle, by the formulas below.

$$(I_{ENG} + I_{C1} + I_{R2})\dot{\omega}_{ENG} = \tau_{ENG} + \frac{1 + R_1 + R_2}{R_1} T_{MG1} - R_2 T_{MG2} \quad \text{Formula 1}$$

$$\omega_{MG1} = \frac{1 + R_1 + R_2}{R_1} \omega_{ENG} - \frac{1 + R_2}{R_1} \omega_{out} \quad \text{Formula 2}$$

In particular, R1 corresponds to a gear ratio of a ring gear of a first planetary gear set 1, R2 corresponds to a gear ratio of a ring gear of a second planetary gear set 1, $\omega_{out}$ corresponds to an output velocity of the second carrier gear and $\omega_{ENG}$ corresponds to an output velocity of the engine.

Further, the output shaft torque that is outputted by the system is calculated, by e.g. a control unit installed in the vehicle, by Formula 3 below.

$$\tau_{out} = (1 + R_2)T_{MG2} - \frac{1+R_2}{R_1}T_{MG1} \qquad \text{Formula 4}$$

In particular, $T_{MG2}$ corresponds to a torque of the second motor minus an inertia torque of the second motor, and $T_{MG1}$ corresponds to a torque of the first motor minus an inertia torque of the first motor.

Figure 5:
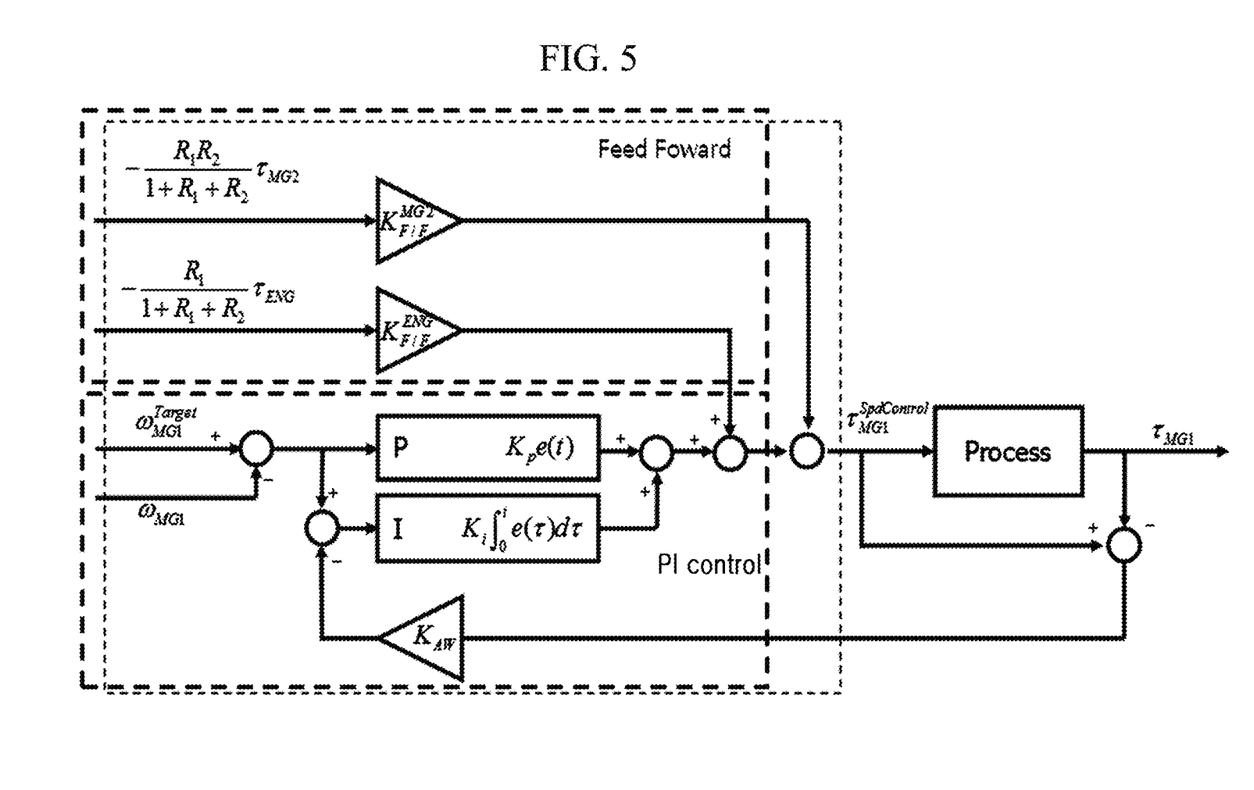
FIG. 5 is a flowchart for controlling a first motor-generator for controlling a hybrid gear shifting system according to an exemplary embodiment of the present invention.
Figure 6:
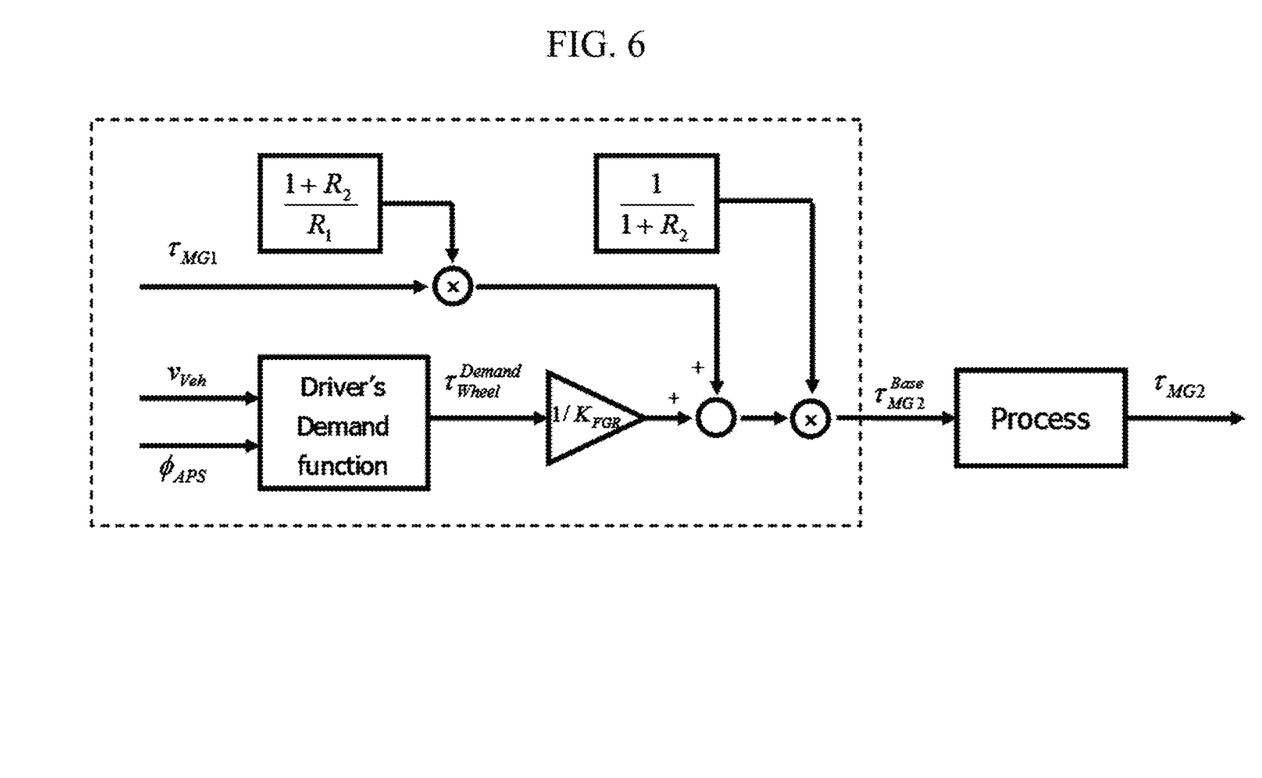
FIG. 6 is a flowchart for controlling a second motor-generator for controlling a hybrid gear shifting system according to an exemplary embodiment of the present invention.

FIG. 5 is a flowchart for controlling a first motor-generator for controlling a hybrid gear shifting system according to an exemplary embodiment of the present invention, and FIG. 6 is a flowchart for controlling a second motor-generator for controlling a hybrid gear shifting system according to an exemplary embodiment of the present invention.

Referring to FIG. 5 and FIG. 6, in a complex divergence mode of FHS4 according to an exemplary embodiment of the present invention, when the engine 100 is speed-controlled by the first motor-generator MG1, a PI torque is generated through an error from a target speed, and a feed-forward torque that is related to a torque of the engine 100 and a torque of the second motor-generator MG2 is further added thereto. Simultaneously, the torque of the second motor-generator MG2 is generated to satisfy the demand torque of the driver.

Figure 7:
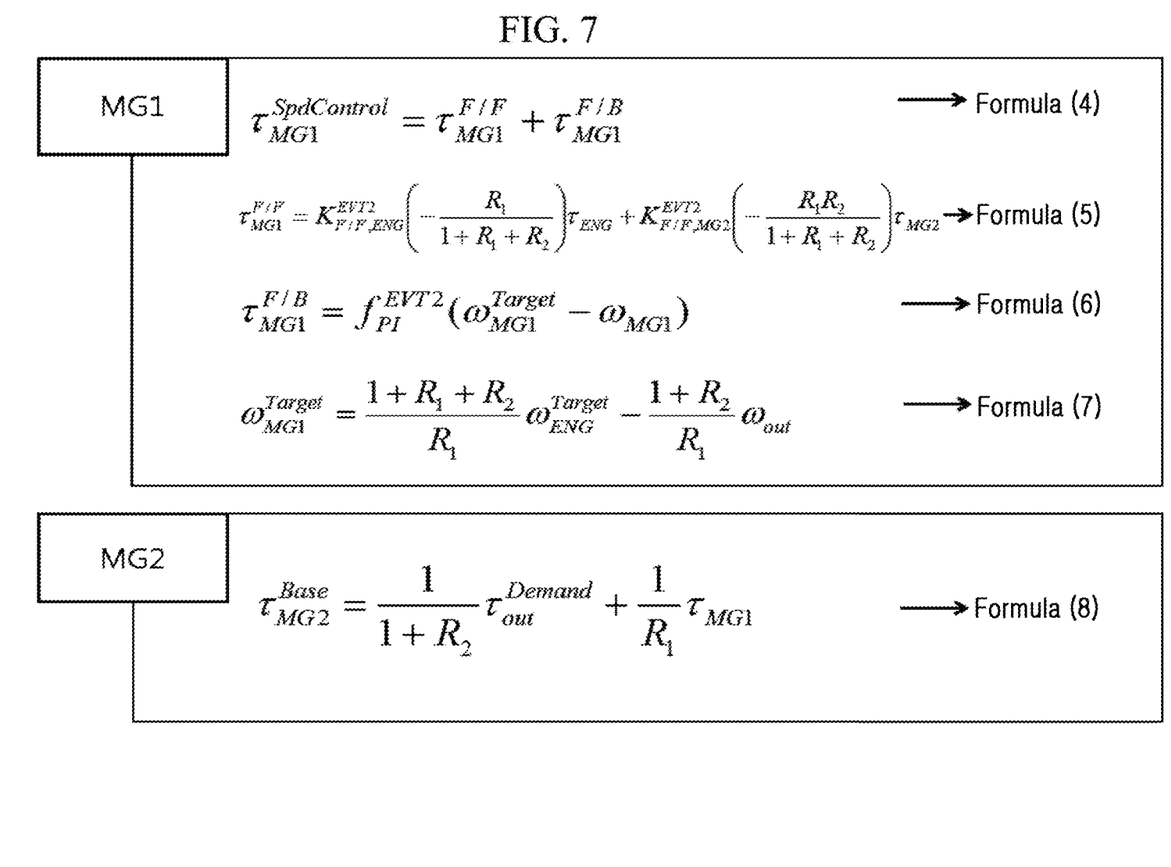
FIG. 7 shows formulas for controlling first and second motor-generators for controlling a hybrid gear shifting system according to an exemplary embodiment of the present invention.

FIG. 7 shows formulas for controlling first and second motor-generators for controlling a hybrid gear shifting system according to an exemplary embodiment of the present invention.

A demand torque of the first motor-generator MG1 is calculated, by at least one control unit installed in the vehicle, by following Formulas 4, 5, 6, and 7.

$$\tau_{out} = (1 + R_2)T_{MG2} - \frac{1+R_2}{R_1}T_{MG1} \qquad \text{Formula 4}$$

$$\tau_{MG1}^{F/F} = K_{F/F,ENG}^{EVT2}\left(-\frac{R_1}{1+R_1+R_2}\right)\tau_{ENG} + K_{F/F,MG2}^{EVT2}\left(-\frac{R_1 R_2}{1+R_1+R_2}\right)\tau_{MG2} \qquad \text{Formula 5}$$

$$\tau_{MG1}^{F/B} = f_{PI}^{EVT2}\left(\omega_{MG1}^{Target} - \omega_{MG1}\right) \qquad \text{Formula 6}$$

$$\omega_{MG1}^{Target} = \frac{1+R_1+R_2}{R_1}\omega_{ENG}^{Target} - \frac{1+R_2}{R_1}\omega_{out} \qquad \text{formula 7}$$

In particular, $\tau^{F/F}{}_{MG1}$ corresponds to a feed forward torque of the first motor generator, $\tau_{FIB/MG1}$ corresponds to feedback torque of the first motor generator, $K^{EVT2}{}_{/F/F/ENG}$ corresponds to a torque gain in a EVT2 mode for an engine, $K^{EVT2}{}_{/F/F/ENG}$ corresponds to a torque gain in a EVT2 mode for the second motor generator, $\tau_{MG2}$ corresponds to an output torque of the first motor generator, $\tau_{ENG}$ corresponds to an output torque of the engine, $f_{EVT2}$ corresponds to a function of the EVT2 mode $\omega^{Target}{}_{MG1}$ corresponds to a target velocity of the first motor generator and $\omega_{MG1}$ corresponds to an actual velocity of the first motor generator.

The demand torque of the second motor-generator MG2 is calculated, likewise, by the following Formula 8.

$$\tau_{MG2}^{Base} = \frac{1}{1+R_2}\tau_{out}^{Demand} + \frac{1}{R_1}\tau_{MG1} \qquad \text{Formula 8}$$

In particular, $\tau^{Demand}{}_{out}$ corresponds to a demand torque requested to be out and $\tau_{MG1}$ corresponds to a torque of the first motor generator.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A control method of a hybrid vehicle that includes a first planetary gear set having a first sun gear, a first planetary gear, a first ring gear, and a first carrier, a second planetary gear set having a second sun gear, a second planetary gear, a second ring gear, and a second carrier, an engine connected to the first carrier via a first output shaft, a first motor-generator configured to rotate the first ring gear, a second motor-generator connected to the second sun gear to rotate the second sun gear and the first sun gear, a first brake configured to brake the first ring gear, a second brake configured to brake the second ring gear, a first clutch selectively connecting the first ring gear with the first carrier, and a second clutch selectively connecting the first carrier with the second ring gear, the method comprising:

controlling, by a control unit installed in the vehicle, the second clutch to be engaged;

outputting torque through a second output shaft that is connected to the second carrier, the torque supplied from the engine and the first and second motor-generators;

controlling, by the control unit installed in the vehicle, the speed of the engine by using the first motor-generator; and controlling, by the control unit installed in the vehicle, the torque of the second output shaft by using the second motor-generator wherein a rotation speed of the first motor-generator is controlled so that the engine reaches a predetermined target speed, and wherein the predetermined target speed of the engine is calculated by Formula 2 below:

$$\omega_{MG1} = \frac{1+R_1+R_2}{R_1}\omega_{ENG} - \frac{1+R_2}{R_1}\omega_{out}, \qquad \text{Formula 2}$$

wherein R1 corresponds to a gear ratio of a ring gear of a first planetary gear set, R2 corresponds to a gear ratio of a ring gear of a second planetary gear set, $\omega_{out}$ corresponds to an output velocity of the second carrier gear and $\omega_{ENG}$ corresponds to an output velocity of the engine.

2. The control method of a hybrid vehicle of claim 1, wherein a torque of the second output shaft is calculated by Formula 3 below:

$$\tau_{out} = (1 + R_2)T_{MG2} - \frac{1+R_2}{R_1}T_{MG1}, \qquad \text{Formula 3}$$

wherein $T_{MG2}$ corresponds to a torque of the second motor minus an inertia torque of the second motor, and $T_{MG1}$ corresponds to a torque of the first motor minus an inertia torque of the first motor.

3. The control method of a hybrid vehicle of claim 1, wherein a target torque for a speed control of the first motor-generator is calculated by Formulas 4, 5, and 6 below:

$$\tau_{MG1}^{SpdControl} = \tau_{MG1}^{F/F} + \tau_{MG1}^{F/B} \qquad \text{Formula 4}$$

$$\tau_{MG1}^{F/F} = K_{F/F,ENG}^{EVT2}\left(-\frac{R_1}{1+R_1+R_2}\right)\tau_{ENG} + K_{F/F,MG2}^{EVT2}\left(-\frac{R_1 R_2}{1+R_1+R_2}\right)\tau_{MG2} \qquad \text{Formula 5}$$

$$\tau_{MG1}^{F/B} = f_{PI}^{EVT2}\left(\omega_{MG1}^{Target} - \omega_{MG1}\right), \qquad \text{Formula 6}$$

wherein $\tau^{FIF}{}_{/MG1}$ corresponds to a feed forward torque of the first motor generator, $T_{FIB/MG1}$ corresponds to a feedback torque of the first motor-generator, $K^{EVT2}{}_{/FIF/ENG}$ corresponds to a torque gain in a EVT2 mode for the engine, $K^{EVT2}{}_{/FIF/ENG}$ corresponds to a torque gain in a EVT2 mode for the second motor-generator, $\tau_{MG2}$ corresponds to an output torque of the first motor generator, $T_{ENG}$ corresponds to an output torque of the engine, $f_{EVT2}$ corresponds to a function of the EVT2 mode $\omega^{Target}{}_{MG1}$ corresponds to a target velocity of the first motor-generator and $\omega_{MG1}$ corresponds to an actual velocity of the first motor-generator.

4. The control method of a hybrid vehicle of claim 1, wherein a target torque for a torque control of the second motor-generator is calculated by a Formula 8 below:

$$\tau_{MG2}^{Base} = \frac{1}{1+R_2}\tau_{out}^{Demand} + \frac{1}{R_1}\tau_{MG1}, \qquad \text{Formula 8}$$

wherein $\tau^{Demand}{}_{out}$ corresponds to a demand torque requested to be out and $\tau_{MG1}$ corresponds to a torque of the first motor-generator.

\* \* \* \* \*